United States Patent
Song et al.

(10) Patent No.: US 9,739,143 B2
(45) Date of Patent: Aug. 22, 2017

(54) FAULT DETECTION FOR ACTIVE DAMPING OF A WELLBORE LOGGING TOOL

(71) Applicant: HALLIBURTON ENERGY SERVICES, INC., Houston, TX (US)

(72) Inventors: Xingyong Song, Houston, TX (US); Yiming Zhao, Katy, TX (US); Jason D. Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/914,203

(22) PCT Filed: Aug. 7, 2014

(86) PCT No.: PCT/US2014/050184
§ 371 (c)(1),
(2) Date: Feb. 24, 2016

(87) PCT Pub. No.: WO2016/022132
PCT Pub. Date: Feb. 11, 2016

(65) Prior Publication Data
US 2016/0215614 A1    Jul. 28, 2016

(51) Int. Cl.
*E21B 47/14* (2006.01)
*G01V 1/48* (2006.01)
*G01V 1/52* (2006.01)

(52) U.S. Cl.
CPC ............ *E21B 47/14* (2013.01); *G01V 1/48* (2013.01); *G01V 1/523* (2013.01); *G01V 2200/14* (2013.01); *G01V 2200/16* (2013.01)

(58) Field of Classification Search
CPC ...... E21B 47/122; E21B 47/123; E21B 47/14; G01V 1/40; G01V 1/42; G01V 1/44;
(Continued)

(56) References Cited

U.S. PATENT DOCUMENTS 5,216,638 A    6/1993  Wright
6,064,488 A *  5/2000  Brand ................... G01N 21/39
                                                            356/437
(Continued)

FOREIGN PATENT DOCUMENTS

WO    03-071097 A1    8/2003

OTHER PUBLICATIONS

International Search Report and Written Opinion issued in related PCT Application No. PCT/US2014/050184, mailed on May 14, 2015 (15 pages).

(Continued)

*Primary Examiner* — Hovhannes Baghdasaryan
(74) *Attorney, Agent, or Firm* — Benjamin Fite; Baker Botts L.L.P.

(57) ABSTRACT

Systems and methods for detecting faults in the active damping of a logging tool are disclosed herein. A wellbore logging tool system comprises a processor, a memory, a wellbore logging tool comprising an acoustic transmitter, and a logging tool control module. The logging tool control module is operable to receive sensor signals from one or more sensors coupled to the wellbore logging tool after a damping control signal has been transmitted to the acoustic transmitter. The logging tool control module is also operable to determine one or more expected sensor signals, determine error values using the expected sensor signals and the sensor signals received from the one or more sensors, and compare the error values with one or more thresholds.

26 Claims, 8 Drawing Sheets

(58) Field of Classification Search
CPC ...... G01V 1/48; G01V 1/523; G01V 2200/14; G01V 2200/16
See application file for complete search history.

(56) References Cited

U.S. PATENT DOCUMENTS

| | | |
|---|---|---|
| 6,671,224 B1 | 12/2003 | Pabon |
| 6,837,332 B1 | 1/2005 | Rodney |
| 7,639,562 B2 | 12/2009 | Patterson et al. |
| 2002/0062992 A1* | 5/2002 | Fredericks ............. E21B 47/00 175/40 |
| 2005/0022987 A1 | 2/2005 | Green et al. |
| 2008/0078544 A1* | 4/2008 | Christian ................ G01J 3/02 166/264 |
| 2008/0234939 A1* | 9/2008 | Foot ....................... E21B 43/00 702/12 |
| 2009/0005995 A1 | 1/2009 | Tang et al. |
| 2010/0097887 A1 | 4/2010 | Patterson et al. |
| 2011/0108720 A1* | 5/2011 | Ford ....................... E21B 49/08 250/262 |

OTHER PUBLICATIONS

International Preliminary Report on Patentability issued in related Application No. PCT/US2014/050184, dated Feb. 16, 2017 (7 pages).

* cited by examiner

|     | Zone 1 | Zone 2 | Zone 3 |
| --- | --- | --- | --- |
| $W_1$ | High | Low | Low |
| $W_2$ | High | Low | High |
| $W_3$ | Low | High | Low |

FAULT DETECTION FOR ACTIVE DAMPING OF A WELLBORE LOGGING TOOL

CROSS-REFERENCE TO RELATED APPLICATION

The present application is a U.S. National Stage Application of International Application No. PCT/US2014/050184 filed Aug. 7, 2014, which is incorporated herein by reference in its entirety for all purposes.

BACKGROUND

The present disclosure relates generally to well drilling and hydrocarbon recovery operations and, more particularly, to a system and method of active vibration damping control for a wellbore logging tool.

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, it is often desirable to obtain information about the subterranean formation. One method of obtaining information about the formation is the use of a well logging tool, such as a sonic logging tool. A sonic logging tool may emit an acoustic signal, which propagates through the formation to at least one receiver. The travel time of the acoustic signal from the tool to the receiver may be used to calculate the speed of the acoustic tone through the formation. Properties of the formation may be determined by comparing the speed of the acoustic tone to the speed of sound through various types of rock and fluid that may be encountered in subterranean operations.

BRIEF DESCRIPTION OF THE DRAWINGS

For a more complete understanding of the present disclosure and its features and advantages, reference is now made to the following description, taken in conjunction with the accompanying drawings, in which.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Figure 1:
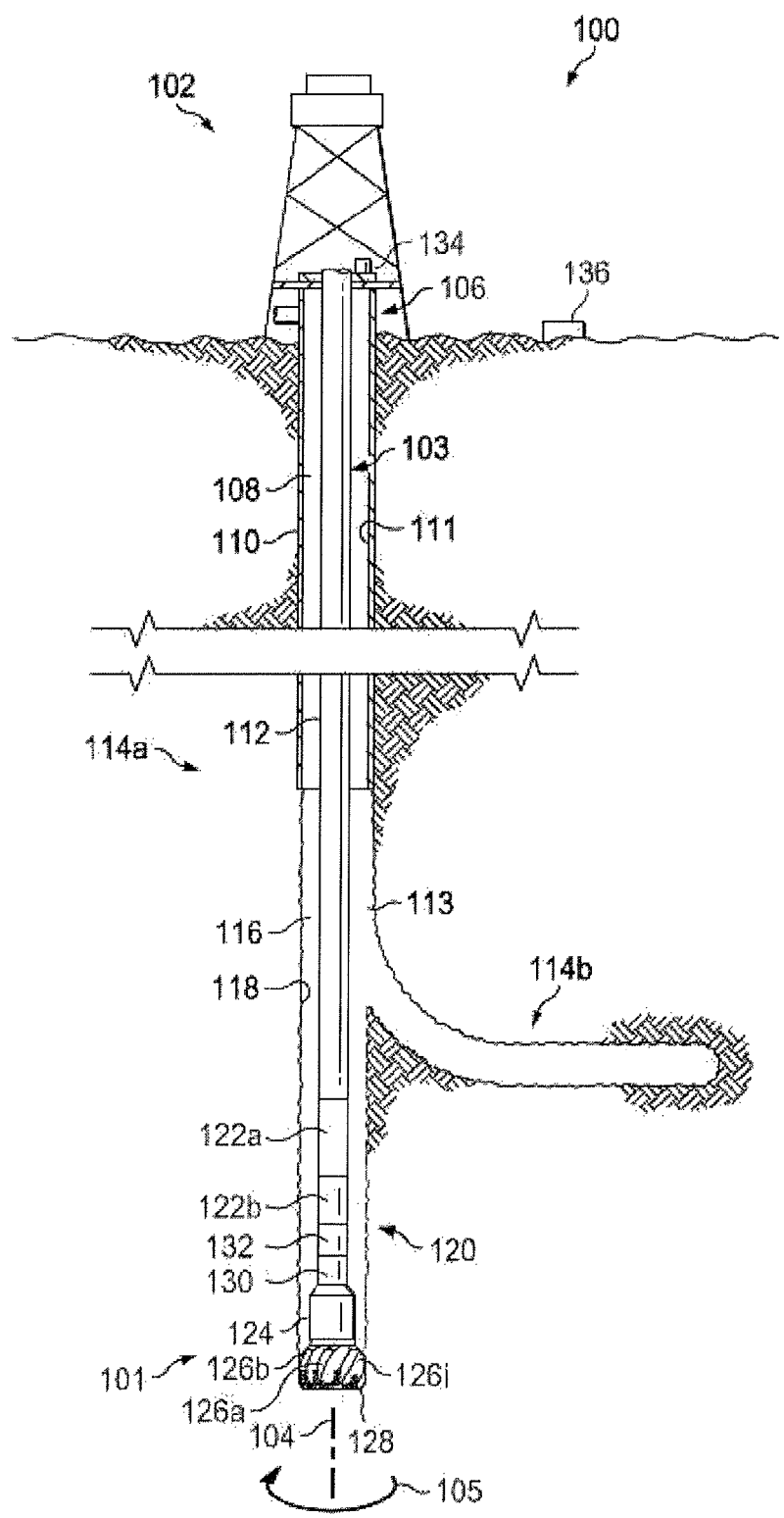
FIG. 1 illustrates an elevation view of an example embodiment of a drilling system used in an illustrative logging-while-drilling (LWD) environment in accordance with some embodiments of the present disclosure.
Figure 2:
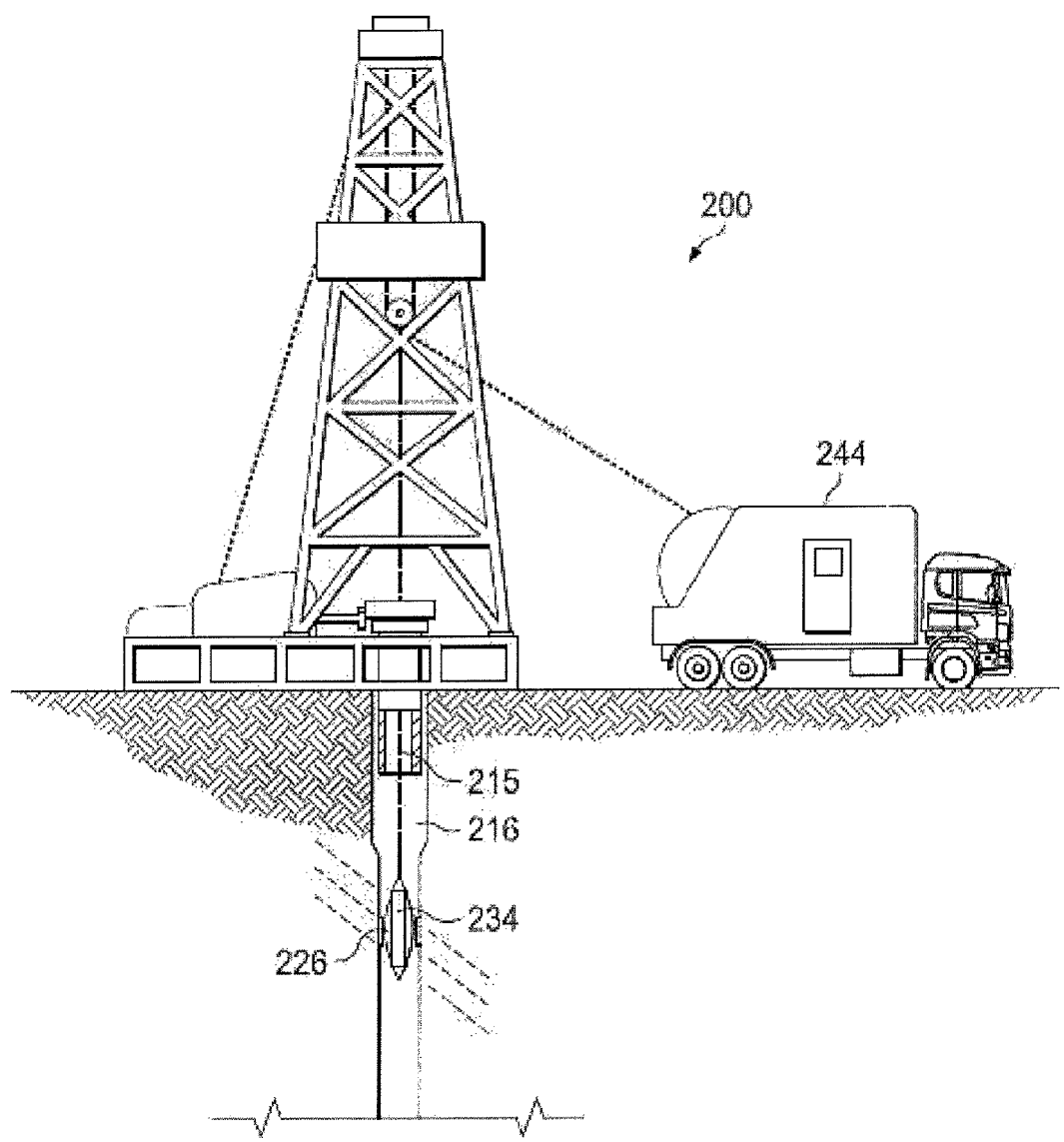
FIG. 2 illustrates an elevation view of an example embodiment of a downhole system used in an illustrative logging environment with the drill string removed in accordance with embodiments of the present disclosure.

The present disclosure describes a control system and associated method for controlling unwanted or excessive vibrations in components (e.g., an acoustic transmitter) of a wellbore logging tool. The wellbore logging tool may be located on a drill string, as shown in FIG. 1, or on a wireline, as shown in FIG. 2. The wellbore logging tool may be any suitable type of wellbore logging tool, including a sonic logging tool that emits a signal in the form of an acoustic waveform. To improve the efficiency of a subterranean operation, it may be desirable to damp unwanted vibrations in components of the wellbore logging tool, such as oscillation or ringing in the acoustic transmitter of the wellbore logging tool. For instance, components of a sonic logging tool, such as an acoustic transmitter (e.g., a spring-mass system), may oscillate due to excitations during the process of generating the acoustic signal. The oscillation of the components of the sonic logging tool, also known as "ringing," may be in the frequency range of the emitted acoustic signal. The ringing may result in lower quality data, may increase the time required to perform the logging, and may require more energy input into the logging tool. Accordingly, a system and method may be designed in accordance with the teachings of the present disclosure to reduce the ringing in the acoustic transmitter of the logging tool and improve the quality of the acoustic signal emitted by the logging tool, reduce the time and cost of performing wellbore logging, and reduce the total energy input requirements for the logging tool. Although the automated control system and method described herein are directed to the active damping of unwanted vibrations in a sonic logging tool, the control system and method may be adapted to optimize other aspects of a subterranean operation including other types of wellbore logging tools.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 9, where like numbers are used to indicate like and corresponding parts.

Referring now to the drawings, FIG. 1 illustrates an elevation view of an example embodiment of drilling system 100 used in an illustrative logging-while-drilling (LWD) environment, in accordance with some embodiments of the present disclosure. Modern petroleum drilling and production operations use information relating to parameters and conditions downhole. Several methods exist for collecting downhole information during subterranean operations, including LWD. In LWD, data is typically collected during a drilling process, thereby avoiding any need to remove the drilling assembly to insert a wireline logging tool. LWD consequently allows an operator of a drilling system to make accurate real-time modifications or corrections to optimize performance while minimizing down time. In wireline logging, a logging tool may be suspended in the wellbore from a wireline and may take measurements of the wellbore and subterranean formation.

Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drill string 103 associated with drill bit 101 that may be used to form a wide variety of wellbores or bore holes such as generally vertical wellbore 114a or generally horizontal 114b wellbore or any other angle, curvature, or inclination. Various directional drilling techniques and associated components of bottom hole assembly (BHA) 120 of drill string 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical but may generally refer to any wellbore not drilled only vertically. "Uphole" may be used to refer to a portion of wellbore 114 that is closer to well surface 106 via the path of the wellbore 114. "Downhole" may be used to refer to a portion of wellbore 114 that is further from well surface 106 via the path of wellbore 114.

BHA 120 may be formed from a wide variety of components configured to form wellbore 114. For example, components 122a, and 122b of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drill string 103 and rotary drill bit 101. BHA 120 may also include various types of well logging tools and other downhole tools associated with directional drilling of a wellbore. Examples of logging tools and/or directional drilling tools may include, but are not limited to, acoustic, neutron, gamma ray, density, photoelectric, nuclear magnetic resonance, induction, resistivity, caliper, coring, seismic, rotary steering, and/or any other commercially available well tools. Further, BHA 120 may also include a rotary drive (not expressly shown) connected to components 122a, and 122b and which rotates at least part of drill string 103 together with components 122a, and 122b.

In the illustrated embodiment, logging tool 130 may be integrated with BHA 120 near drill bit 101 (e.g., within a drilling collar, for example a thick-walled tubular that provides weight and rigidity to aid in the drilling process, or a mandrel). In certain embodiments, drilling system 100 may include control unit 134, positioned at the surface, in drill string 103 (e.g., in BHA 120 and/or as part of logging tool 130), or both (e.g., a portion of the processing may occur downhole and a portion may occur at the surface). Control unit 134 may include a control system or a control algorithm for logging tool 130. Control unit 134 may be communicatively coupled to logging tool 130 and, in one or more embodiments, may be a component of logging tool 130. In certain embodiments, a control system or an algorithm may cause control unit 134 to generate and transmit control signals (e.g., actuation or damping signals) to one or more elements of logging tool 130. For example, control unit 134 may generate a damping control signal for logging tool 130 based on dynamic states of logging tool, as discussed in more detail with reference to FIGS. 4 and 5.

Logging tool 130 may be integrated into drilling system 100 at any point along the drill string 103. Logging tool 130 may include receivers (e.g., antennas) and/or transmitters capable of receiving and/or transmitting one or more acoustic signals. The transmitter may include any type of transmitter suitable for generating an acoustic signal, such as a solenoid or piezoelectric shaker. In some embodiments, logging tool 130 may include a transceiver array that functions as both a transmitter and a receiver. A drive signal may transmitted by control unit 134 to logging tool 130 to cause logging tool 130 to emit an acoustic signal. As the bit extends wellbore 114 through the formations, logging tool 130 may collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments. In some embodiments, logging tool 130 may include sensors to record the environmental conditions in wellbore 114, such as the ambient pressure, ambient temperature, the resonance frequency, or the phase of the vibration. Telemetry sub 132 may be included on drill string 103 to transfer tool measurements to surface receiver 136 and/or to receive commands from control unit 134 (when control unit 134 is at least partially located on the surface). Telemetry sub 132 may transmit downhole data to a surface receiver 30 and/or receive commands from the surface receiver 30. Telemetry sub 132 may transmit data through one or more wired or wireless communications channels (e.g., wired pipe or electromagnetic propagation). Alternatively, telemetry sub 132 may transmit data as a series of pressure pulses or modulations within a flow of drilling fluid (e.g., mud-pulse or mud-siren telemetry), or as a series of acoustic pulses that propagate to the surface through a medium, such as the drill string. Sensors included in logging tool 130 may provide information used to perform measurements on the vibration and/or motion of logging tool 130. The measurements may be used to determine the active damping control signals for logging tool 130 that may reduce the amount of ringing associated with logging tool 130.

Drilling system 100 may also include facilities (not expressly shown) that may include computing equipment configured to collect, process, and/or store the measurements received from receivers on logging tool 130 and/or surface receiver 136. The facilities may be located onsite or offsite.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drill string 103 to attached drill bit 101. The drilling fluids may be directed to flow from drill string 103 to respective nozzles passing through rotary drill bit 101. The drilling fluid may be circulated back to well surface 106 through annulus 108 defined in part by outside diameter 112 of drill string 103 and inside diameter 118 of wellbore 114. Inside diameter 118 may be referred to as the "sidewall" of wellbore 114. Annulus 108 may also be defined by outside diameter 112 of drill string 103 and inside diameter 111 of casing string 110. Open hole annulus 116 may be defined as sidewall 118 and outside diameter 112.

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

At various times during the drilling process, drill string 103 may be removed from wellbore 114 and a wellbore logging tool may be used to obtain information about the subterranean formation. FIG. 2 illustrates an elevation view of an example embodiment of downhole system 200 used in an illustrative logging environment with the drill string removed, in accordance with some embodiments of the present disclosure. Subterranean operations may be conducted using wireline system 234 once the drill string has been removed. However, at times, some or all of the drill string may remain in wellbore 114 during logging with wireline system 234. Wireline system 234 may include one or more logging tools 226 that may be suspended into wellbore 216 by conveyance 215 (e.g., a cable, slickline, coiled tubing, or the like). Logging tool 226 may be similar to logging tool 130, as described with reference to FIG. 1. Logging tool 226 may be communicatively coupled to conveyance 215. Conveyance 215 may contain conductors for transporting power to wireline system 234 and telemetry from logging tool 226 to logging facility 244. Alternatively, conveyance 215 may lack a conductor, as is often the case using slickline or coiled tubing, and wireline system 234 may contain a control unit similar to control unit 134, shown in FIG. 1, that contains memory, one or more batteries, and/or one or more processors for performing operations and storing measurements. Logging facility 244 (shown in FIG. 2 as a truck, although it may be any other structure) may collect measurements from logging tool 226, and may include computing facilities for controlling, processing, or storing the measurements gathered by logging tool 226. The computing facilities may be communicatively coupled to logging tool 226 by way of conveyance 215 and may operate similarly to control unit 134 and/or surface receiver 136, as shown in FIG. 1. An example of a computing facility is described with more detail with reference to FIGS. 3 and 4.

While performing a logging operation, a component of logging tool 130, as shown in FIG. 1, or logging tool 226, as shown in FIG. 2 (e.g. an acoustic transmitter coupled to the logging tool) may oscillate, or ring, after emitting an acoustic signal. The ringing may be in the range of the acoustic signal emitted by the logging tool and may decrease the quality of the acoustic signal. The decrease in signal quality may increase the logging time or may result in higher energy requirements for the logging tool. Therefore, it may be advantageous to reduce the ringing of the logging tool, as discussed in further detail with respect to FIGS. 4 and 5. For example, a system or method according to the present disclosure may damp the ringing of logging tool 130, as shown in FIG. 1, or logging tool 226, as shown in FIG. 2, and may improve the quality of the acoustic signal. One method for damping the ringing of the acoustic transmitter of logging tool 130 or logging tool 226 may include determining damping control signals that actively slow the vibrations of an acoustic transmitter in the logging tool after an actuation signal has generated the vibrations in the system. The damping control signals may be based on current or future predicted dynamic states of the logging tool or components thereof, and may be based on information from sensors coupled to the logging tool. As such, systems and methods designed according to the present disclosure may enable more accurate and more efficient measurements of the subterranean formation taken with the wellbore logging tool.

Figure 3:
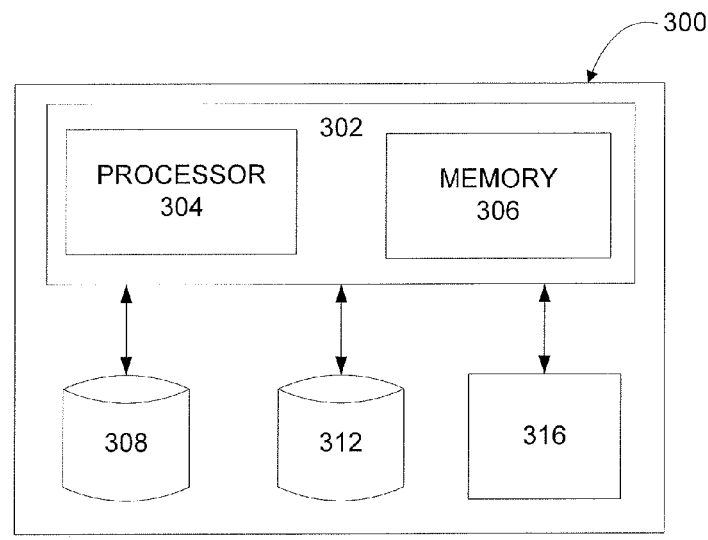
FIG. 3 illustrates a block diagram of an example logging tool control system for a wellbore logging tool in accordance with embodiments of the present disclosure.

FIG. 3 illustrates a block diagram of an exemplary logging tool control system 300, in accordance with some embodiments of the present disclosure. Logging tool control system 300 may be configured to determine and generate optimal damping control signals to damp vibrations in a wellbore logging tool, such as logging tool 130 or logging tool 226. Logging tool control system 300 may be used to perform the steps of methods 700, 800, and/or 900 as described with respect to FIGS. 7, 8, and 9, respectively. In some embodiments, logging tool control system 300 may include logging tool control module 302. Logging tool control system 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

Logging tool control module 302 may include any suitable components. For example, in some embodiments, logging tool control module 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out control of the vibrations of a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Logging tool control system 300 may further include parameter database 308. Parameter database 308 may be communicatively coupled to logging tool control module 302 and may provide parameters in response to a query or call by logging tool control module 302. Parameter database 308 may be implemented in any suitable manner, such as by parameters, functions, definitions, instructions, logic, or code, and may be stored in, for example, a database, file, application programming interface, library, shared library, record, data structure, service, software-as-service, or any other suitable mechanism. Parameter database 308 may specify any suitable parameters that may impact the dynamics of a logging tool, such as the ambient pressure of the wellbore (e.g., wellbore 114), and the resonance period of the logging tool (e.g., logging tool 130 or logging tool 226).

Logging tool control system 300 may further include logging tool dynamics database 312. Logging tool dynamics database 312 may be communicatively coupled to logging tool control module 302 and may provide logging tool dynamics in response to a query or call by logging tool control module 302. Logging tool dynamics database 312 may be implemented in any suitable manner, such as by parameters, functions, definitions, instructions, logic, or code, and may be stored in, for example, a database, file, application programming interface, library, shared library, record, data structure, service, software-as-service, or any other suitable mechanism. Logging tool dynamics database 312 may specify any suitable properties of the logging tool that may be of interest for controlling the vibration of the logging tool, such as the acceleration, speed, and energy consumption rate of the logging tool (e.g., logging tool 130 or logging tool 226). Although logging tool control system 300 is illustrated as including two databases, logging tool control system 300 may contain any suitable number of databases.

In some embodiments, logging tool control module 302 may be configured to determine and generate damping control signals for a wellbore logging tool. For example, logging tool control module 302 may be configured to import one or more instances of parameter database 308 and/or one or more instances of logging tool dynamics database 312. Parameter database 308 and/or logging tool dynamics database 312 may be stored in memory 306. Logging tool control module 302 may be further configured to cause processor 304 to execute program instructions operable to determine a damping control signal for damping excess vibration (i.e., ringing) in a wellbore logging tool. For example, processor 304 may, based on parameter database 308 and logging tool dynamics database 308, receive information associated with dynamic states of the logging tool and may generate a damping control signal for actively damping the vibrations in the logging tool, as discussed in further detail with reference to FIGS. 4-5. For example, processor 304 may determine the optimal damping control signals for logging tool 130 or logging tool 226, as shown in FIGS. 1 and 2.

Logging tool control module 302 may be communicatively coupled to one or more displays 316 such that information processed by logging tool control module 302 (e.g., optimal drive signals for the logging tool) may be conveyed to operators of drilling and logging equipment.

Modifications, additions, or omissions may be made to FIG. 3 without departing from the scope of the present disclosure. For example, FIG. 3 shows a particular configuration of components of logging tool control system 300. However, any suitable configurations of components may be used. For example, components of logging tool control system 300 may be implemented either as physical or logical components. Furthermore, in some embodiments, functionality associated with components of logging tool control system 300 may be implemented in special purpose circuits or components. In other embodiments, functionality associated with components of logging tool control system 300 may be implemented in configurable general purpose circuit or components. For example, components of logging tool control system 300 may be implemented by configure computer program instructions.

Figure 4:
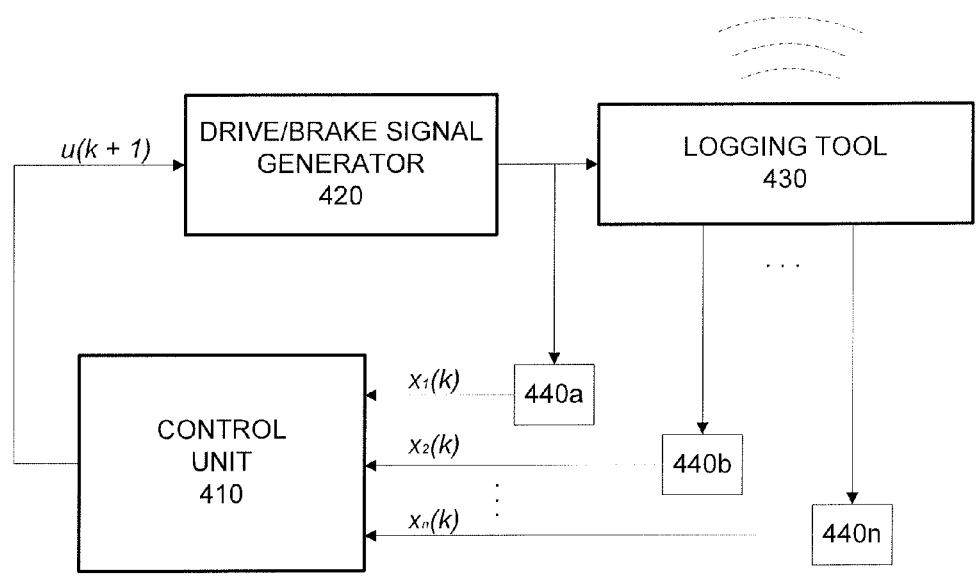
FIG. 4 illustrates a vibration control system for a wellbore logging tool in accordance with embodiments of the present disclosure.

FIG. 4 illustrates an example logging tool vibration control system 400 in accordance with embodiments of the present disclosure. System 400 may include control unit 410, drive/brake signal generator 420, logging tool 430, and one or more sensors 440 communicatively coupled together. In particular embodiments, control unit 410 and/or drive/brake signal generator may comprise a logging tool control system such as system 300 of FIG. 3 to provide vibration control for logging tool 430. Control unit 410 may be operable to transmit control signals (e.g., actuation and/or damping control signals) to drive/brake signal generator 420, which may in turn transmit an appropriate signal to logging tool 430 in order to cause or stop vibrations therein. For example, drive/brake signal generator 420 may amplify the control signal sent by control unit 410 before transmitting the amplified control signal to logging tool 430. The control signals generated by control unit 410 may comprise actuation or damping signals. Actuation signals may refer to any suitable signal for initiating or causing vibrations in logging tool 430, while damping signals may refer to any suitable signal for slowing or stopping vibrations in logging tool 430. In particular embodiments, the control signals may comprise pulses transmitted periodically, such as every few milliseconds.

Control unit 410 may receive signals from logging tool 430 and/or sensors 440 coupled to logging tool 430 after an actuation or damping signal has been transmitted to logging tool 430. Using these received signals, control unit 410 may determine optimal control signals, as described further below. Control unit 410 may be located in any suitable location of the wellbore. For example, control unit 410 may be directly coupled to logging tool 430 downhole. As another example, control unit 410 may be communicatively coupled to a surface control unit in the wellbore, such as control unit 136 of FIG. 1, and may be configured to transmit received or determined signals to such control unit 136 periodically. As yet another example, control unit 410 may be a component or module of a surface control unit such as control unit 136 of FIG. 1. In another example, control unit 410 may be an integral part of the logging tool 430, e.g. coupled to an acoustic transmitter disposed therein.

Drive/brake signal generator 420 may comprise any suitable components for modifying the control signal (actuation or damping) transmitted by control unit 410 into a suitable waveform for transmission to logging tool 430 to perform the functions dictated by the control signal. For example, in embodiments with an electrically driven logging tool 430, drive/brake signal generator 420 may comprise an amplifier that amplifies the signal generated by control unit 410 prior to transmitting the signal to logging tool 430. As another example, in embodiments with a mechanically driven logging tool 430, drive/brake signal generator 420 may convert the electrical control signal sent by control unit 410 into a mechanical signal suitable for transmission to logging tool 430.

Logging tool 430 may comprise an acoustic transmitter (e.g., a spring-mass system, not shown) responsive to a control signal (actuation or damping) transmitted by drive/brake signal generator 420. For example, logging tool 430 may generate an acoustic signal by vibrating the acoustic transmitter using an actuation signal, and may slow the vibrations of the acoustic transmitter using a damping signal. The vibrations of the acoustic transmitter may be generated through any suitable means. For example, the acoustic transmitter may include a piezo-electrically actuated spring-mass system, an electromagnetically actuated spring-mass system, a cylinder-piston actuation system, and/or any suitable combinations thereof. Logging tool 430 may further comprise an acoustic receiver. The acoustic receiver of logging tool 430 may detect the acoustic signal generated by the acoustic transmitter of logging tool 430, and may transmit associated signals to control unit 410 for analysis. In addition, sensors 440 may detect characteristics associated with logging tool 430 during operation, and may transmit the associated signals to control unit 410 for analysis.

Sensors 440 may include any suitable sensors (e.g., accelerometers, magnetometers, etc.) for measuring physical and/or electrical characteristics or properties of logging tool 430. For example, sensors 440 may include sensors for measuring current (e.g., an ammeter) or voltages (e.g., a voltmeter) in drive/brake signal generator (e.g., amplifier currents or voltages), back EMF signals (e.g., a voltmeter) from logging tool 430 (e.g., electromagnetic feedback voltage), magnetic flux in logging tool 430, material deformation in logging tool 430, temperature near or in logging tool 430, pressure near or in logging tool 430, and/or acceleration (e.g., an accelerometer) of components (e.g., the spring-mass system of an acoustic transmitter) in logging tool 430 (which may include measurements of position and velocity). In some embodiments, an amplifier output voltage (e.g., from an amplifier in drive/brake signal generator 420) and a back EMF voltage from logging tool 430 may be measured by the same voltage sensor coupled to logging tool 430.

Ideally, when an actuation signal is transmitted to logging tool 430, the tool will generate vibrations in the acoustic transmitter that are substantially similar to the actuation signal. However, at the end of actuation, the acoustic transmitter may continue to vibrate or resonate beyond that which was intended by the transmitted actuation signal. This excessive vibration may be referred to as ringing. As described further below, in particular embodiments, control unit 410 may receive measurements $x_n(k)$ (where k represents the current state of measurement x) from sensors 440 that indicate current dynamic states of logging tool 430 (or components thereof) and, using those measurements, may determine a control signal $u(k+1)$ (where k+1 represents the next state) to transmit to drive/brake signal generator. The determined control signal may be designed to damp unwanted vibrations or ringing seen in logging tool 430. Drive/brake signal generator may then modify the control signal (e.g., amplify) and transmit the modified signal to logging tool 430.

Figure 5:
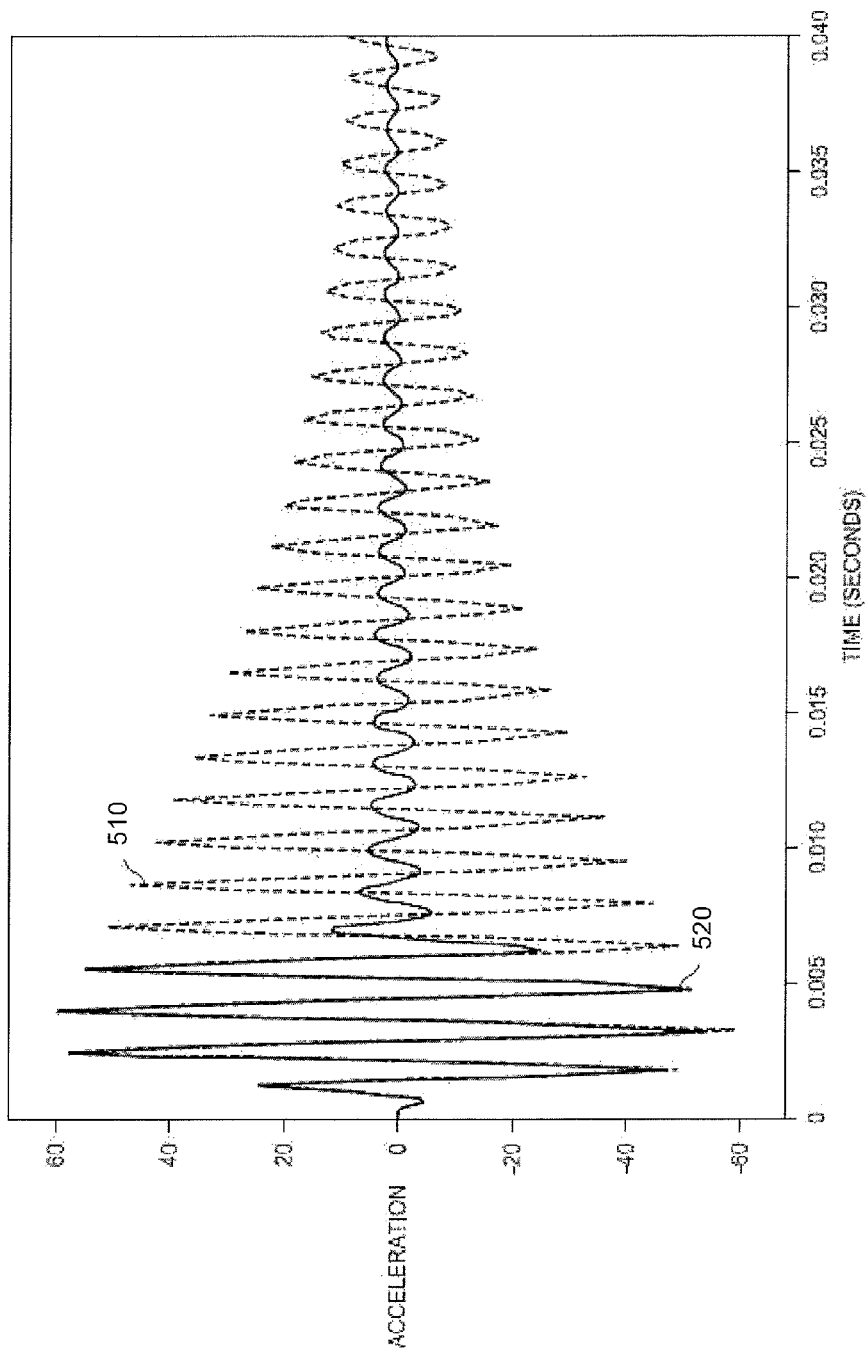
FIG. 5 illustrates example vibration signals generated by a wellbore logging tool in accordance with embodiments of the present disclosure.

FIG. 5 illustrates example vibration signals generated by a wellbore logging tool in accordance with embodiments of the present disclosure. Curve 510 of FIG. 5 illustrates an example vibration of the logging tool without any active damping control (i.e., only with the inherent mechanical damping of the system), while curve 520 of FIG. 5 illustrates an example ideal vibration signal of the wellbore logging tool. To achieve this ideal vibration signal and avoid the excessive ringing in the wellbore logging tool, the vibrations of the acoustic transmitter of the logging tool may be controlled through the use of damping. The current approach to damping the acoustic transmitters of wellbore logging tools relies on passive damping techniques that, for example, use friction caused by materials (e.g., fluids) coupled to or near the acoustic transmitter that may damp the ringing in the vibration signal. However, these passive damping materials may deteriorate over time and/or become much less effective in operation conditions (e.g., high temperature and/or high pressure), which may cause the acoustic transmitter to continue ringing and not be properly damped.

Accordingly, particular embodiments of the present disclosure provide systems and methods to damp the ringing effect shown in FIG. 5 through the use of active damping techniques rather than passive damping techniques. These active damping techniques may include transmitting damping control signals to the logging tool in the same manner as the actuation signal is transmitted. For example, a control unit (e.g., control unit 410 of FIG. 4) may transmit an actuation signal to the logging tool (e.g., logging tool 430 of FIG. 4). After transmitting the actuation signal, control unit 410 may receive signals from sensors (e.g., sensors 440) coupled to the logging tool and, using those signals, determine an optimal damping control signal and transmit the damping control signal to the logging tool that may cause the logging tool to damp any ringing in the tool or components thereof (e.g., a spring-mass system of an acoustic transmitter that generated the vibrations in response to the actuation signal).

The determined damping signals may be based on dynamic system state feedback in some embodiments. By transmitting a damping control command after the original actuation signal, a resistance force may be generated in the acoustic transmitter that may stop the oscillating motion of the transmitter. The damping control signal may be generated in real time (i.e., every sampling interval) in particular embodiments, and may be generated through any suitable means. For instance, one technique for generating a damping control signal may involve using a function of the dynamic system states of the acoustic transmitter as the control function. Actively damping the acoustic transmitter using a damping control signal may provide reliable damping results under temperature and/or pressure variations. In addition, active damping through the use of a damping control signal may require much less (if any) passive damping controls, which may lead to increased acoustic transmitter output strengths without increasing the actuation signal amplitude (as the passive damping materials may always provide opposing friction forces).

In particular embodiments, the damping control signal may be determined using a control function based on current states of the wellbore logging tool. An example of such a control function for a wellbore logging tool is shown below in Equation (1):

$$u(k+1)=a_1(T,P)f_1(x_1(k))+a_2(T,P)f_2(x_2(k))+a_3(T,P)f_3(x_3(k))+ \ldots +a_n(T,P)f_n(x_n(k)) \quad (1)$$

where k is the current discrete sampling step (assume k=0 at the beginning of each acoustic transmitter signal), $x_1(k)$, $x_2(k)$, ... $x_n(k)$ are the dynamic states of the acoustic transmitter. The dynamic system states of the acoustic transmitter may be variables that indicate an energy status of the acoustic transmitter in particular embodiments, and may include physical variables such as the position, velocity, or acceleration of the acoustic transmitter, the pressure, temperature, or material deformation on components of the acoustic transmitter, or electrical characteristics such as the voltage and/or current of electrical circuits in the acoustic transmitter or the magnetic flux generated by the acoustic transmitter. The dynamic system states may be determined from measurements of sensors coupled to the wellbore logging tool, such as sensors 440 as illustrated in FIG. 4.

Variables $a_1, a_2, \ldots a_n$ of Equation (1) are coefficients (which may vary with time) that on the variation of temperature T and pressure P. Functions $f_1, f_2, \ldots f_n$ represent functions (either linear or non-linear) of the dynamic states as they relate to the control of the damping of the acoustic transmitter. The values of the states $x_1(k), x_2(k), \ldots X_n(k)$ may be obtained in real time (e.g., updated at every sampling interval), and could be measured directly in some embodiments. In other embodiments, the states $x_1(k), x_2(k), \ldots X_n(k)$ could be estimated in closed-loop observer form as shown in Equation (2):

$$\hat{X}(k+1)=A(T,P)h[\hat{X}(k)]+B(T,P)u(k)+L(T,P)(y(k)-\hat{y}(k))$$

$$\hat{y}(k)=C(T,P)\hat{X}(k)+D(T,P)u(k) \quad (2)$$

where X(k) is the n-dimensional vector containing the estimated states at step k (i.e., the current state; k+1 indicates the next state), u(k) is the damping control command value at step k, A(T,P), B(T,P), C(T,P), D(T,P) are each matrices of the estimator in Equation (2) (that are dependent on temperature T and pressure P), h is a function (either linear or nonlinear) of state variables, L is the gain vector for the closed-loop estimator, y is a variable vector which contains combinations of states.

If functions $f_1, f_2, \ldots f_n$ of Equation (1) are linear, the damping control function may be as shown in Equation (3):

$$u(k)=K(T,P)\hat{X}(k) \quad (3)$$

where K(T,P) is an n-dimensional row vector containing parameter varying state feedback control gains. The control gain K(T,P) could be designed, in some embodiments, such that a cost function (e.g., a cost function indicating a total energy of the acoustic transmitter, the magnitude or duration of ringing in the logging tool, the peak amplitude of the damping control signal, etc.) could be minimized. One example of a suitable cost function is shown below in Equation (4):

$$\int_{k=0}^{k=kfinal} [W_1 \times Velocity^2 + W_2 \times Position^2 + W_3 \times Voltage \times Current + W_4 \times Voltage^2 + W_5 \times Current^2 + W_6 \times (Magnetic\ Flux)^2 + W_7 \times Pressure^2 + W_8 \times Pressure \times Deformation + W_9 \times Temperature^2 + W_{10} \times Deformation^2 + W_{11}[u(k)]^2] \quad (4)$$

where $W_1, W_2, \ldots W_{11}$ are weighting functions associated with each term in Equation (4). The weighting functions could be pre-determined in some embodiments, while in other embodiments, the weighting functions could be determined in real-time (e.g., every sampling period). One example analytical representation that can be used to minimize the cost function shown above in Equation (4) is shown below in Equation (5):

$$K(T,P)=-W_{11}^{-1}B(T,P)^T M(T,P) \quad (5)$$

where M is solved through the function shown below is Equation (6):

$$MA(T,P) + A^T(T,P)M - \frac{MB(T,P)B^T(T,P)M}{W_{11}} = \quad (6)$$

$$\begin{bmatrix} W_1 & W_3 & 0 & 0 & 0 & 0 & 0 & 0 \\ 0 & W_2 & 0 & 0 & 0 & 0 & 0 & 0 \\ 0 & 0 & W_4 & 0 & 0 & 0 & 0 & 0 \\ 0 & 0 & 0 & W_5 & 0 & 0 & 0 & 0 \\ 0 & 0 & 0 & 0 & W_6 & 0 & 0 & 0 \\ 0 & 0 & 0 & 0 & 0 & W_7 & 0 & W_8 \\ 0 & 0 & 0 & 0 & 0 & 0 & W_9 & 0 \\ 0 & 0 & 0 & 0 & 0 & 0 & 0 & W_{10} \end{bmatrix}$$

In particular embodiments, future dynamic states of the wellbore logging tool may be determined, and then used to adjust the current damping control signal to provide optimal future dynamic system states using certain cost functions. For example, a set of future damping control signals may be denoted as $u^k(k), u^k(k+1), \ldots, u^k(k\_final)$, where u(k) indicates the damping control signal at sampling step k. Then with the estimator Equation (2), the future dynamic states could be estimated as vectors $X^k(k), X^k(k+1), \ldots, X^k(k\_final)$. Using the determined future dynamic states, a new set of damping control signals $u^{k+1}(k+1), u^{k+1}(k+2), \ldots, u^{k+1}(k\_final)$ may be determined based on the states estimation with the optimization constraint to be minimized being as shown in Equation (7):

$$W_3 \times ringing\ duration + \int_{t=k+1}^{k=kfinal} [W_1 \times control\ energy + W_2 \times max(|u^{k+1}(t)|] \quad (7)$$

where control energy=(voltage(t)×current(t)), and $W_1$, $W_2$, $W_3$ are weighting functions (which may be pre-determined or determined in real-time). The optimized control value $u^{k+1}(k+1)$ may then be used as the damping control signal at sampling instant k+1. This may happen at the same time the states X (k+1) are measured in particular embodiments. The states measurements could then be used to update the estimator to be as shown below is Equation (8), from which the future states could be updated again:

$$\hat{X}(k+2)=A(T,P)h[X_{measured}(k+1)]+B(T,P)u(k+1) \quad (8)$$

The control input $u^{k+2}(k+2)$ could therefore be determined using the same optimization process as previously described. This process may repeat until the end of the control cycle in particular embodiments.

Figures 6A, 6B:
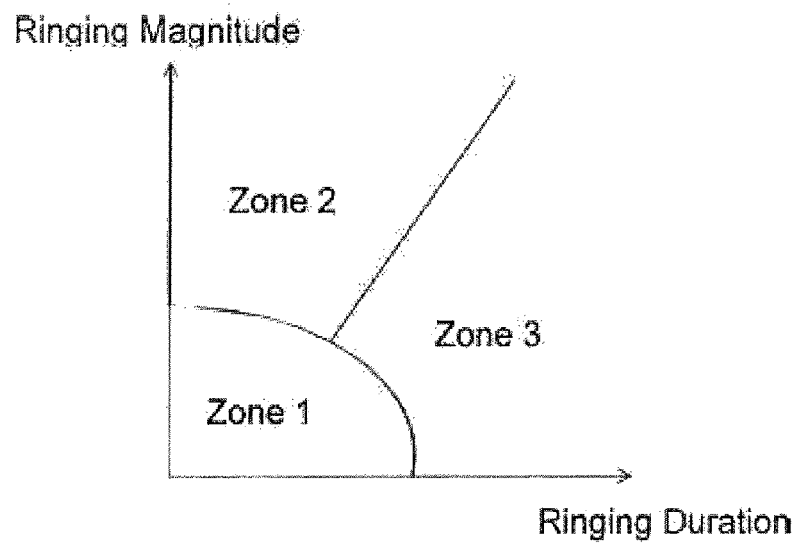
FIGS. 6A-6B illustrate an example technique for determining weighting functions of a damping control signal in accordance with embodiments of the present disclosure.

It will be understood (as noted above) that the weighting functions $W_1$, $W_2$ and $W_3$ of Equation (7) may be determined and updated in real-time. This may be performed through minimizations of cost functions. In particular embodiments, the weighting functions may be determined based on a zone detection technique as shown in FIGS. 6A-6B. The zone map in FIG. 6A may be used in some embodiments to determine optimal weighting functions using the vibration magnitude and/or the ringing duration. For instance, if the ringing magnitude and ringing duration (from start to current time) lies in zone 1 of FIG. 6A, then the value of $W_1$ and $W_2$ should be relatively high while the value of $W_3$ should be relatively low as shown in FIG. 6B.

Likewise, if the ringing magnitude and ringing duration fall into zone 2 of FIG. 6A, the value of $W_3$ should be relatively high, while the values of $W_1$ and $W_2$ should be relatively low as shown in FIG. 6B. Furthermore, if the ringing magnitude and ringing duration fall within zone 3 of FIG. 6A, the value of $W_2$ should be relatively high, while the values of $W_1$ and $W_3$ should be relatively low as shown in FIG. 6B.

Figure 7:
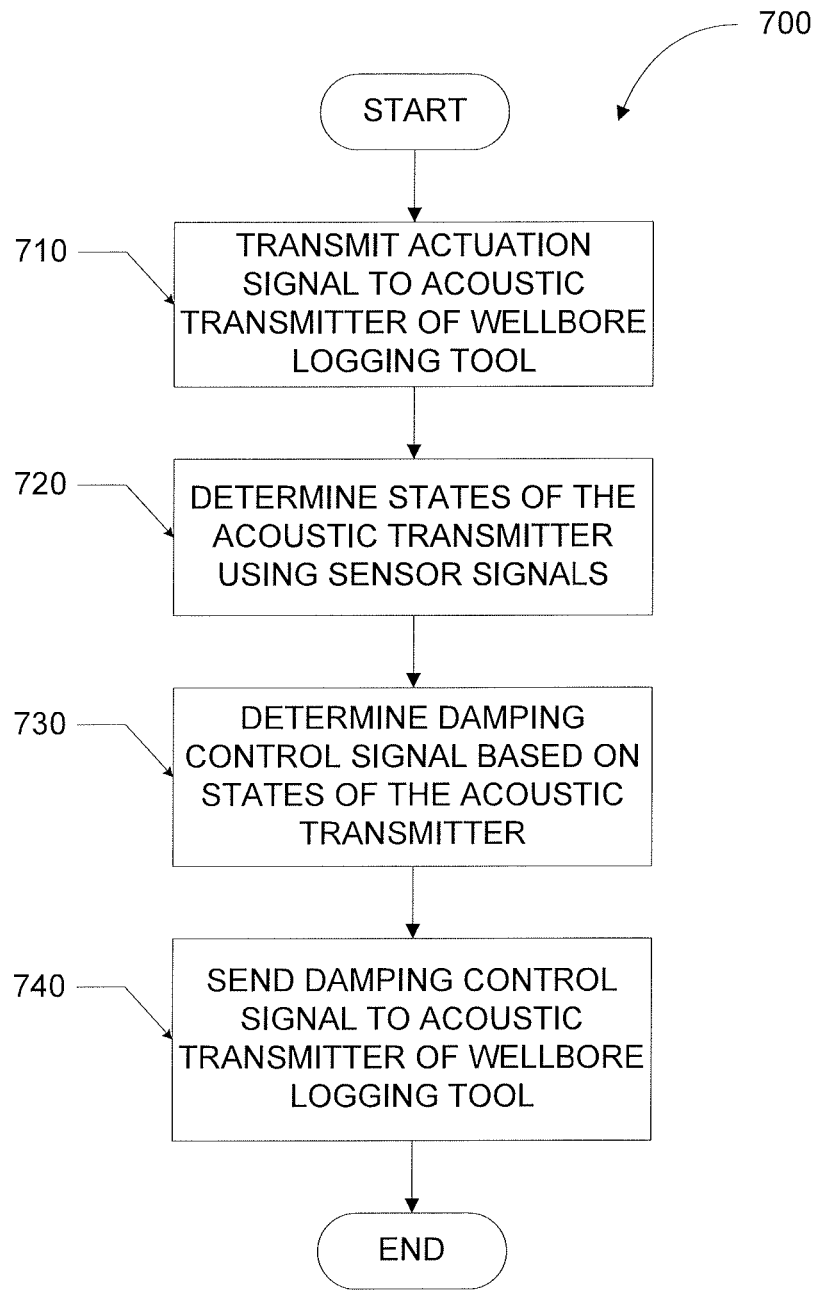
FIG. 7 illustrates an example method for actively damping vibrations in the acoustic transmitter of a wellbore logging tool in accordance with embodiments of the present disclosure.

FIG. 7 illustrates an example method 700 for actively damping vibrations in the acoustic transmitter of a wellbore logging tool in accordance with embodiments of the present disclosure. The method begins at step 710 where an actuation signal is transmitted to the wellbore logging tool. For example, referring to FIG. 4, control unit 410 may transmit an actuation signal to logging tool 430, which may pass through drive/brake signal generator 420 as described above. In particular embodiments, the actuation signal may be configured to generate vibrations a component of the wellbore logging tool, such as an acoustic transmitter (e.g., a spring-mass system).

At step 720, operating states of wellbore logging tool are determined after the actuation signal has been transmitted. The states may be determined using measurements or signals generated by sensors (e.g., sensors 440) coupled the logging tool. The states may include determining one or more characteristics of the acoustic transmitter, such as physical (e.g., position, velocity, acceleration, temperature, pressure) or electrical (e.g., voltage, current, magnetic flux) characteristics. In particular embodiments, current states of wellbore logging tool may be determined (e.g., x(k) shown in FIG. 4). In further embodiments, future states of wellbore logging tool may also be determined in addition to the current states of the tool. The states of wellbore logging tool may be expressed in function form when received from the sensors (e.g., x(k) shown in FIG. 4).

At step 730, a damping control signal for wellbore logging tool is determined. The damping control signal may be determined by a control unit (e.g., control unit 410 of FIG. 4) coupled to the logging tool and configured to optimally damp the vibrations generated by the actuation signal transmitted to the wellbore logging tool in step 710. In particular embodiments, the damping control signal may be determined by minimizing a cost function as described above. The cost function may be determined using the states of wellbore logging tool determined at step 720, and may represent any suitable function that, when minimized, provides an optimal control of vibrations in the logging tool. For example, the cost function may be based on a current amount of energy in the wellbore logging tool, the magnitude or duration of ringing in the logging tool, the peak amplitude of the damping control signal, etc. The damping control signal is then transmitted at step 740 to the wellbore logging tool to actively damp the vibrations in the tool.

Modifications, additions, or omissions may be made to method 700 without departing from the scope of the present disclosure. For example, the order of the steps may be performed in a different manner than that described and some steps may be performed at the same time. Additionally, each individual step may include additional steps without departing from the scope of the present disclosure.

Active damping control according to the present disclosure should be able to damp the ringing seen in a wellbore logging tool. Nevertheless, in particular embodiments, the control unit (e.g., control unit 410 of FIG. 4) coupled to a wellbore logging tool may be further operable to detect and diagnose faults in the damping control of the wellbore logging tool and monitor any failure modes that arise during operation. The fault detection and diagnosis may be determined using measurements from sensors coupled to the wellbore logging tool in particular embodiments. As such, three types of failure modes may occur: control command failure, electronic system failure, and/or sensor failure. Aspects of the present disclosure may be well suited to automatically detect these failures, and may also be well suited to detect a failing sensor or location of the tool and provide diagnosis information for the damping control signal for appropriate adaptation to the failure.

In particular embodiments, a model-based method of detecting faults may be utilized. The model could be physical model or a data-trained model, such as neural network model with base functions. As discussed above, sensors may be coupled to wellbore logging tool to measure characteristics such as amplifier current or voltage output, back EMF (electromagnetic feedback voltage), and/or transmitter acceleration, velocity, or position. The amplifier output voltage and the back EMF voltage may be measured by the same voltage meter in some embodiments. Typically, for the same actuation cycle (e.g., the time period shown in FIG. 5 that includes both actuation and damping of the logging tool), the measurement for the first few milliseconds of the cycle may be the amplifier output voltage while the remainder may be back EMF voltage ripple. Through periodic sensor measurements, differences between the two types of signals (or other signals) may be determined.

Using the sensor measurements, fault detection may be accomplished by comparing the sensor measurements or signals with expected values, determining error values based on the comparison, and then comparing the error values to one or more thresholds and determining whether the errors seen are above the threshold values. Table 1 below shows example cases of determined errors with corresponding diagnoses using measurements from a current sensor, a voltage sensor, an EMF sensor, and an acceleration sensor of a wellbore logging tool.

TABLE 1

| | Current sensor error | Voltage sensor error | EMF sensor error | Acceleration sensor error | Diagnosis |
|---|---|---|---|---|---|
| Case 1 | > | < | < | < | Current sensor malfunction |
| Case 2 | < | < | < | > | Acceleration sensor malfunction |
| Case 3 | < | < | > | > | Damping control signal malfunction |
| Case 4 | < | < | > | < | EMF circuit malfunction |
| Case 5 | < | > | > | < | Voltage meter malfunction |
| Case 6 | > | > | < | < | Amplifier malfunction |
| Case 7 | > | > | > | > | Damping control signal or electrical malfunction |

Since many sensors' readings may be somehow associated with the same component of the system (and thus may be associated with other sensors' readings), cases where only one of many sensors associated with the component indicates an error may be due to a malfunctioning sensor. For example, considering the Case 1 scenario of Table 1, where only the current sensor reading error exceeds the associated threshold, then the issue is likely caused by a current sensor malfunction. This is because the voltage and current sensors should both be within threshold conditions at the same time, and if one is not, then that sensor is likely not functioning correctly. As another example, the issue of Case 2, where only the acceleration reading error exceeds the associated threshold, is likely caused by an accelerometer malfunction. This is because EMF voltage correlates with acceleration, and so the actual acceleration of the wellbore logging tool should be within the threshold set if the EMF reading error is normal. Thus, an out of boundary acceleration sensor reading error may be due to the failure of the acceleration sensor itself.

Similar logic may be applied to Case 5, where the voltage sensor reading error is above the threshold while the current sensor reading error is within the threshold. In Case 5, however, the EMF sensor reading error may also be higher than threshold (as shown) due to the same voltage meter providing measurements for both the voltage and EMF sensors. Case 4 is quite similar; but here, the EMF circuit itself may be the cause of the malfunction rather than the voltage meter since the voltage sensor reading error is within the threshold.

In Case 6, where both voltage and current sensor reading errors are above threshold, but EMF and acceleration sensor reading errors are above, it may be determined that the amplifier transmitting the damping control signal has malfunctioned. In this event, the amplifier may have over-damped the actuation signal. The over-damping may have been caused by too much output from the amplifier, causing the current and voltage sensor readings to be above the error thresholds. However, this scenario would cause EMF and acceleration sensor readings to be within the error thresholds due to the signal being damped when expected (it was damped too quickly in fact).

Considering the Case 3 scenario of Table 1, however, it may be determined that the damping control signal did not ideally remove ringing where both the amplifier voltage and current readings are within boundary thresholds, but EMF voltage and acceleration errors are high. This is because the ringing (as shown in FIG. 2C) may cause the EMF sensor to be above threshold during the time period pas the actuation signal (i.e., the ringing amplitudes occur when they are not expected), and similarly because the acceleration signals are also higher than expected during that time (little to no acceleration would be expected if properly damped). However, since the ringing is not caused by the actuation signal, the voltage and current sensors will read within threshold levels in this scenario.

Case 7 of Table 1 illustrates an example situation where all sensor readings are above threshold. In that case, it is difficult to determine whether the damping control signal is not ideal for damping the vibrations of the a wellbore logging tool or whether the electronic system has entirely malfunctioned. Further investigation (e.g., diagnosis through data-based models as described below) may be required in such situations to detect and diagnose errors.

It will be understood that Table 1 is just one example set of scenarios and that many other scenarios are contemplated by the present disclosure. For example, there could be fewer or more sensors used on a wellbore logging tool, and the diagnosis for either situation may be performed under similar philosophies as shown in Tables 2, 3 and 4 below.

TABLE 2

| | Voltage sensor error | EMF sensor error | Acceleration sensor error | Diagnosis |
| --- | --- | --- | --- | --- |
| Case 1 | < | < | > | Acceleration sensor malfunction |
| Case 2 | < | > | > | Damping control signal malfunction |
| Case 3 | < | > | < | EMF circuit malfunction |
| Case 4 | > | > | < | Voltage meter malfunction |
| Case 5 | > | < | < | Amplifier malfunction |
| Case 6 | > | > | > | Damping control signal or electrical malfunction |

TABLE 3

| | Voltage sensor error | EMF sensor error | Diagnosis |
| --- | --- | --- | --- |
| Case 1 | > | < | Amplifier sensor malfunction |
| Case 2 | > | > | Damping control signal/Amplifier sensor malfunction |
| Case 3 | < | > | Damping control signal malfunction |

TABLE 4

| | Current sensor error | Voltage sensor error | EMF sensor error | Diagnosis |
| --- | --- | --- | --- | --- |
| Case 1 | < | < | > | Damping control signal/EMF sensor malfunction |
| Case 2 | > | > | < | Amplifier malfunction |
| Case 3 | > | > | > | Damping control signal or electrical malfunction |
| Case 4 | < | > | > | Voltage meter malfunction |

In some embodiments, the sensor measurements (not errors) may be compared with a pre-defined threshold (without any model estimate) to detect and determine faults in the system. Techniques such as those of Tables 1-4 may also be used in such embodiments for slightly finer detection and diagnoses. Either way, such techniques could be used for coarse diagnosis when the sensor readings are far beyond normal working ranges, for example.

In certain embodiments, a data-based method for detecting and diagnosing faults may be utilized. For instance, as one example, features from the vibration measurement (such as the EMF voltage, tool acceleration, or other forms of vibration measurement) may be extracted to detect and diagnose issues. The eigenvalues of those extracted features may then be determined, along with the time derivatives of the eigenvalues. Normal or desired operation of the damping control signal may be seen if the derivative of the eigenvalues is less than a pre-determined threshold, while undesired behavior indicating a non-ideal damping control signal may be indicated by above-threshold derivatives of the eigenvalues.

As another example, Fourier transform (FFT) analysis may be conducted for the vibration measurement of a single firing cycle. If the damping control signal is properly functioning, the frequency spectrum of the vibration signal should be relatively evenly spread over a band of frequencies (similar to the gain of a band-pass filter). If the frequency spectrum amplitude is relatively high at high frequencies, then a vibration sensor has most likely malfunctioned. However, if the frequency spectrum of the vibration signal is relatively high at mid to low frequencies, then the problem may come from either the electronic device or the damping control signal.

As another example of data-driven analysis, the time series vibration measurement could be re-arranged into a square matrix and then critical features could be extracted from the data. For example, suppose the vibration measurement is y(1), y(2), ... y(k) ... y(N×N) and the re-arranged matrix is denoted as:

$$\begin{bmatrix} y(1) & \ldots & y(N) \\ y(N+1) & \ldots & \ldots \\ \ldots & \ldots & y(N \times N) \end{bmatrix}_{N \times N}$$

Then the eigenvalues for the matrix above could be obtained as a vector $V^T$:

$$V^T = eigenvalue \left\{ \begin{bmatrix} y(1) & \ldots & y(N) \\ y(N+1) & \ldots & \ldots \\ \ldots & \ldots & y(N \times N) \end{bmatrix}_{N \times N} \right\}$$

and the changing rate of the eigenvalue vector among the recent few firing cycles can be obtained as the derivative of the eigenvalue vector as $\nabla V^T$. Similarly, the eigenvalues $U^T$ and its derivative $\nabla U^T$ for the damping control signal could also be extracted. If $\nabla U^T$ is relatively high or higher than expected, it may indicate that the damping control signal from cycle to cycle changes too quickly. In this case, the damping control signal determination should be altered as the operating condition (temperature, pressure) is varying slowly and the damping control signal should adapt at a similar pace. If $\nabla U^T$ is relatively small or smaller than expected, but the derivative of vibration measurement $\nabla V^T$ is out of bound, then the fault may be caused a malfunction in the electronic system (e.g., the amplifier or magnetic coil), which typically could introduce abrupt damping control signal performance failure and allow large amounts of ringing in the vibration signal.

Other fault detection and diagnosis techniques may be employed as well. For example, if the wellbore logging tool passes through a known formation, then the vibration signal could be processed in real time and its pattern could be compared with the expected acoustic signal through that formation. If the gap between an expected pattern for the formation and the actual vibration signal data is high than certain threshold, then it is likely the case that the specific receiver sensor has malfunctioned. Some embodiments may include multiple (over 10) sets of sensors coupled to wellbore logging tool. If all of them show an unexpected signal reflected from a known formation, then the actuation signal generator may have malfunctioned, for example. In addition, in some embodiments, the vibration signals received from each of the receiver sensors may be compared with others sensors' vibration signals to determine differences. As there are multiple sets of adjacent receivers in such embodiments, only a few of the vibration signals being drastically different from the majority may indicate malfunctioning acoustic receivers.

In embodiments where a fault in the damping control signal has been detected and diagnosed, the wellbore logging tool or control unit may modify the damping control accordingly. For example, the weighting functions used in the control signal (discussed above) may be modified in order to more efficiently damp the vibrations of the wellbore logging tool. This may include modifications to intermediate determinations in some embodiments. As an example, the cost function to be minimized in the determination of a damping control signal may be modified to more efficiently damp the vibrations of the wellbore logging tool.

Figure 8:
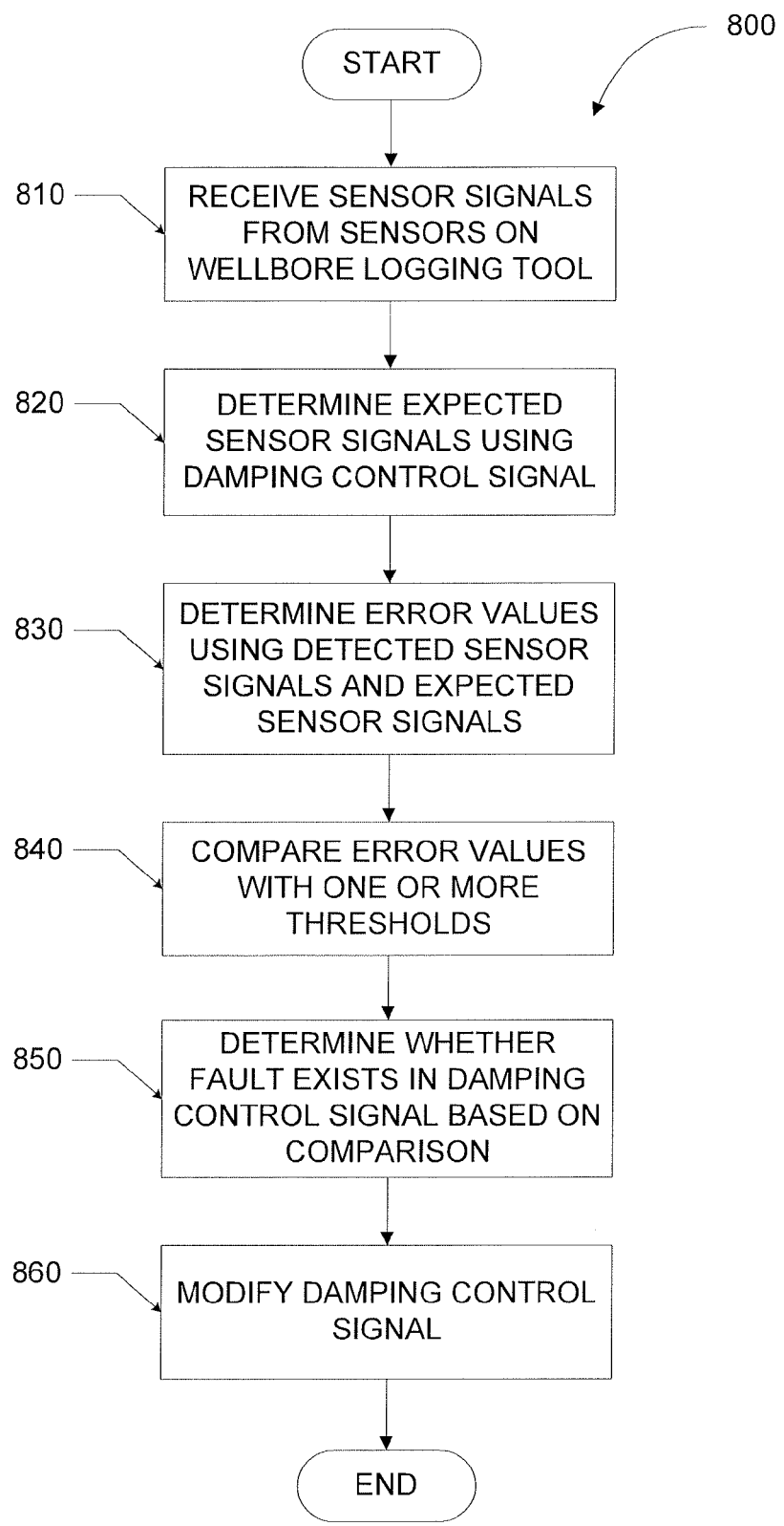
FIG. 8 illustrates an example method for detecting and diagnosing faults in the active damping of a wellbore logging tool in accordance with embodiments of the present disclosure.

FIG. 8 illustrates an example method 800 for detecting and diagnosing faults in the active damping of wellbore logging tool in accordance with embodiments of the present disclosure. The method begins at step 810, where sensor signals are received from one or more sensors (e.g., sensors 440 of FIG. 4) coupled to wellbore logging tool (e.g., logging tool 430 of FIG. 4). The sensors may be any suitable sensor coupled to wellbore logging tool for detecting dynamic states or properties of the tool. The sensors may include, for example, amplifier voltage and/or current sensors, EMF voltage sensors, and tool acceleration sensors as described above. The signals may be received after an actuation signal has been transmitted to wellbore logging tool, and may be signals caused by vibrations generated by the actuation signal.

At step 820, one or more expected sensor signals are determined. Each of the expected may be associated with a sensor signal received at step 810. For example, an expected voltage signal may be determined for a received voltage signal from a voltmeter, and an expected acceleration signal may be determined for a received acceleration signal from an accelerometer. The expected sensor signals may be determined using a damping control signal in some embodiments. The damping control signal may be determined by a control unit (e.g., control unit 410 of FIG. 4) coupled to the logging tool in particular embodiments, and may be configured to damp the vibrations generated in wellbore logging tool by the actuation signal. As an example, to determine a damping control signal, a future state may first be determined according to Equation (2) using a control signal u determined for period k+1 (i.e., u(k+1)) as an input to determine states at k+2, k+3, etc. In some embodiments, future damping control signals may also be determined and used to determine an optimal damping control signal. For example, the predicted future states may be used as inputs to Equation (1) to determine future damping control signals as well, as described above.

At step 830, error values are determined using the expected sensor signals and the sensor signals received from the one or more sensors. The error values may include values determined for each sensor. In certain embodiments, a sensor error value may be determined based on the difference between the expected sensor signal for a specific sensor of the one or more sensors and the sensor signal received from that sensor. In some embodiments, this step may include comparing a frequency response of the expected sensor signals with a frequency response of the sensor signals received from the one or more sensors. In particular embodiments, eigenvalues of the received sensor signals and/or the damping control signal may be determined, along with time derivatives thereof. The time derivatives of the determined eigenvalues and/or time derivatives of the eigenvalues may then be compared with the one or more thresholds.

At step 840, the error values may be compared with one or more thresholds. In some embodiments, the error values for each of the sensors may be compared with one another to detect and determine faults. Based on the comparison, it is determined whether a fault exists in the wellbore logging tool system at step 850. For instance, it may be determined that the errors are caused by fault sensors in some embodiments. In other embodiments, it may be determined that the fault is caused by a damping control signal that does not properly damp vibrations in wellbore logging tool. If a fault is detected in the damping control signal (i.e., the signal does not properly damp the vibrations of wellbore logging tool), then the damping control signal may be modified at step 860. For example, the weighting functions of the damping control signal may be modified. As another example, the cost function to be minimized in the determination of the damping control signal may be modified.

Modifications, additions, or omissions may be made to method 800 without departing from the scope of the present disclosure. For example, the order of the steps may be performed in a different manner than that described and some steps may be performed at the same time. Additionally, each individual step may include additional steps without departing from the scope of the present disclosure.

Figure 9:
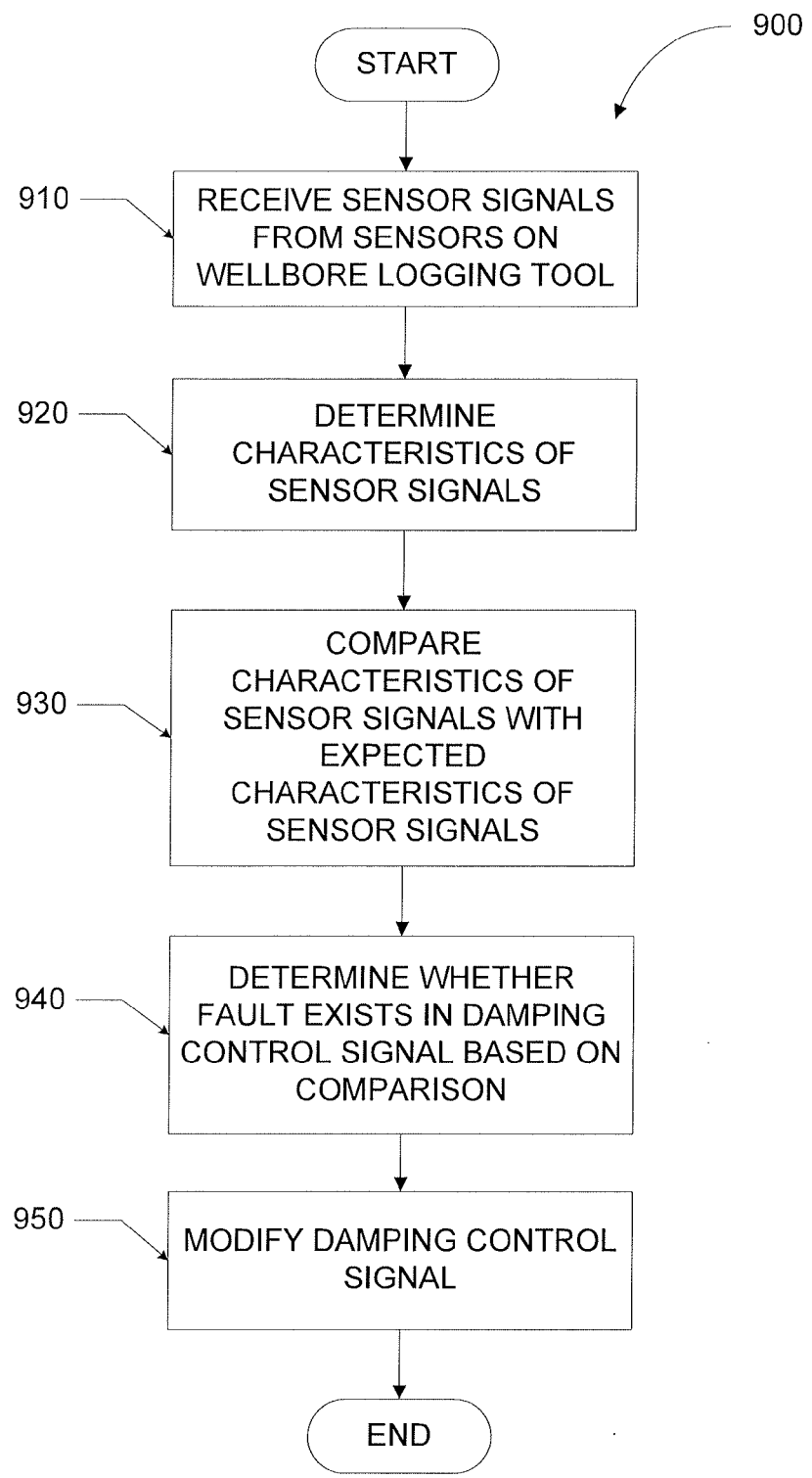
FIG. 9 illustrates another example method for detecting and diagnosing faults in the active damping of wellbore logging tool in accordance with embodiments of the present disclosure.

FIG. 9 illustrates another example method 900 for detecting and diagnosing faults in the active damping of wellbore logging tool in accordance with embodiments of the present disclosure. The method 900 begins at step 910, where sensor signals are received from one or more sensors (e.g., sensors 440 of FIG. 4) coupled to wellbore logging tool (e.g., logging tool 430 of FIG. 4). The sensors may be any suitable sensor coupled to wellbore logging tool for detecting dynamic states or properties of the tool. The sensors may include, for example, amplifier voltage and/or current sensors, EMF voltage sensors, and tool acceleration sensors as described above. The signals may be received in response to an actuation signal being transmitted to wellbore logging tool, and may be caused by vibrations generated by the actuation signal.

At step 920, one or more characteristics of the sensor signals are determined. This may be performed by a control unit (e.g., control unit 410 of FIG. 4) coupled to the wellbore logging tool, and may be performed periodically after the damping control signal has been transmitted to the acoustic transmitter of the wellbore logging tool, in some embodiments. The characteristics may include any suitable characteristics for detecting and/or diagnosing faults with a damping control signal, and may include frequency domain transformations, rates of change in the one or more sensor signals, or rates of change in the damping control signal itself. For example, a frequency response of one of the sensor readings may be determined using a Fourier transform at this step. As another example, derivatives or eigenvalues of the sensor signals and/or the damping control signal may be determined at this step.

At step 930, the one or more characteristics of the sensor signals are compared with expected characteristics. This step may also be performed by a control unit (e.g., control unit 410 of FIG. 4) coupled to the wellbore logging tool, and may be performed for each periodic sensor signal collected at step 920, in some embodiments. This step may include determining an expected characteristic based on the damping control signal transmitted to the acoustic transmitter of the wellbore logging tool in certain embodiments. For example, the frequency domain transformation of a sensor signal may be compared to known or calculated frequency transformations of expected sensor signals. As another example, the rate that the determined damping control signal or sensor signal changes may be compared to expected rates of change in the damping control signal or sensor signal, respectively. In particular embodiments, the rates of change in the signals (damping control or sensor) may be compared to boundaries along with the expected signals.

Based on the comparison, it is then determined whether a fault exists in the wellbore logging tool system at step 940. For instance, it may be determined that the frequency domain transformation of the sensor signal comprises more high- or low-frequency signals than would normally be expected (e.g., based on past results or based on calculations using the damping control signal). This may indicate a fault in the damping control signal (e.g., not damping quickly enough or damping too quickly). As another example, if the rate of change in the damping control signal is faster than expected (i.e., the damping control signal is changing a lot during the active damping of the vibrations), then it may be determined that the damping control signal is not properly damping the vibrations at the start of the active damping period.

If a fault is detected in the damping control signal (i.e., the signal does not properly damp the vibrations of wellbore logging tool), then the damping control signal may be modified at step 950. For example, the weighting functions of the damping control signal may be modified. As another example, the cost function to be minimized in the determination of the damping control signal may be modified. In particular embodiments, information from the one or more sensor signals or determined characteristics of the sensor signals may be used to modify the damping control signal.

Modifications, additions, or omissions may be made to method 900 without departing from the scope of the present disclosure. For example, the order of the steps may be performed in a different manner than that described and some steps may be performed at the same time. Additionally, each individual step may include additional steps without departing from the scope of the present disclosure.

To provide illustrations of one or more embodiments of the present disclosure, the following examples are provided. In one embodiment, a wellbore logging tool system comprises a processor, a memory, a wellbore logging tool comprising an acoustic transmitter, and a logging tool control module. The logging tool control module is operable to receive sensor signals from one or more sensors coupled to the wellbore logging tool after a damping control signal has been transmitted to the acoustic transmitter. The logging tool control module is also operable to determine one or more expected sensor signals, determine error values using the expected sensor signals and the sensor signals received from the one or more sensors, and compare the error values with one or more thresholds.

In certain aspects of the disclosed system, the logging tool control module is further operable to receive the sensor signals from the one or more sensors periodically after a damping control signal has been transmitted to the acoustic transmitter, and determine, for each periodic sensor signal received, an expected sensor signal. In particular aspects of the disclosed system, the logging tool control module is further operable to modify the damping control signal based on the comparison of the error values with the one or more thresholds. In some aspects of the disclosed system, the information from the one or more sensors comprises one or more of the following: a voltage in the acoustic transmitter of the wellbore logging tool, a current in the acoustic transmitter of the wellbore logging tool, or an acceleration of the acoustic transmitter of the wellbore logging tool. In certain aspects of the disclosed system, the logging tool control module is operable to determine the one or more expected sensor signals using the damping control signal.

In one or more aspects of the disclosed system, the one or more sensors comprise a plurality of sensors and the logging tool control module is further operable to determine a sensor error value based on the difference between the expected sensor signal and the sensor signal received from the sensor, and compare the sensor error value to sensor error values for each of the other plurality of sensors.

In one or more aspects of the disclosed system, a first sensor signal received from a sensor of the one or more sensors comprises a first signal associated with a first time period and a second signal associated with a second time period, the first signal associated with a first property of the acoustic transmitter and the second signal associated with a second property of the acoustic transmitter.

In another embodiment, a method for detecting faults in the control of a wellbore logging system comprises receiving sensor signals from one or more sensors coupled to a wellbore logging tool after a damping control signal has been transmitted to an acoustic transmitter of the wellbore logging tool and determining one or more expected sensor signals using the damping control signal. The method also comprises determining error values using the expected sensor signals and the sensor signals received from the one or more sensors, and comparing the error values with one or more thresholds.

In certain aspects of the disclosed method, the method further comprises, receiving the sensor signals from the one or more sensors periodically after a damping control signal has been transmitted to the acoustic transmitter, and determining, for each periodic sensor signal received, an expected sensor signal. In particular aspects of the disclosed method, the method further comprises modifying the damping control signal based on the comparison of the error values with the one or more thresholds. In some aspects of the disclosed method, the information from the one or more sensors comprises one or more of the following: a voltage in the acoustic transmitter of the wellbore logging tool, a current in the acoustic transmitter of the wellbore logging tool, or an acceleration of the acoustic transmitter of the wellbore logging tool. In certain aspects of the disclosed method, the one or more expected sensor signals are determined using the damping control signal.

In one or more aspects of the disclosed method, the one or more sensors comprise a plurality of sensors and the method further comprises determining a sensor error value based on the difference between the expected sensor signal and the sensor signal received from the sensor, and comparing the sensor error value to sensor error values for each of the other plurality of sensors.

In one or more aspects of the disclosed method, a first sensor signal received from a sensor of the one or more sensors comprises a first signal associated with a first time period and a second signal associated with a second time period, the first signal associated with a first property of the acoustic transmitter and the second signal associated with a second property of the acoustic transmitter.

In another embodiment, a wellbore logging tool system comprises a processor, a memory, a wellbore logging tool comprising an acoustic transmitter, and a logging tool control module. The logging tool control module is operable to receive sensor signals from each of one or more sensors coupled to the wellbore logging tool after a damping control signal has been transmitted to the acoustic transmitter. The logging tool control module is also operable to determine one or more characteristics of the sensor signals, determine one or more expected characteristics of the sensor signals, and compare the one or more characteristics of the sensor signals with the one or more expected characteristics.

In certain aspects of the disclosed system, the logging tool control module is further operable to receive the sensor signals from the one or more sensors periodically after a damping control signal has been transmitted to the acoustic transmitter, and the one or more characteristics of the sensor signals are determined using the periodically received sensor signals. In particular aspects of the disclosed system, the logging tool control module is operable to determine the one or more expected characteristics of the sensor signals using the damping control signal. In some aspects of the disclosed system, the logging tool control module is further operable to modify the damping control signal based on the comparison the one or more characteristics with the one or more expected characteristics.

In one or more aspects of the disclosed system, the information from the one or more sensors comprises one or more of the following: an amplifier voltage in the acoustic transmitter of the wellbore logging tool, an amplifier current in the acoustic transmitter of the wellbore logging tool, an electromagnetic feedback voltage in the acoustic transmitter of the wellbore logging tool, or an acceleration of the acoustic transmitter of the wellbore logging tool.

In one or more aspects of the disclosed system, the one or more characteristics comprises a frequency response of a first sensor signal, the one or more expected characteristics comprises an expected frequency response of the first sensor signal, and the logging tool control module is further operable to compare the frequency response of the first sensor signals with the expected frequency response of the first sensor signal.

In one or more aspects of the disclosed system, the logging tool control module is further operable to determine eigenvalues of the sensor signals received from the one or more sensors, determine time derivatives of the eigenvalues of the sensor signals received from the one or more sensors, and compare the time derivatives of the eigenvalues of the sensor signals with the one or more thresholds.

In one or more aspects of the disclosed system, the logging tool control module is further operable to determine eigenvalues of the damping control signal, determine time derivatives of the eigenvalues of the damping control signal, and compare the time derivatives of the eigenvalues of the damping control signal with the one or more thresholds.

In another embodiment, a method for detecting faults in the control of a wellbore logging system comprises receiving sensor signals from each of one or more sensors coupled to the wellbore logging tool after a damping control signal has been transmitted to the acoustic transmitter of the wellbore logging tool. The method further comprises determining one or more characteristics of the sensor signals, determining one or more expected characteristics of the sensor signals, and comparing the one or more characteristics of the sensor signals with the one or more expected characteristics.

In certain aspects of the disclosed method, the method further comprises receiving the sensor signals from the one or more sensors periodically after a damping control signal has been transmitted to the acoustic transmitter, and the one or more characteristics of the sensor signals are determined using the periodically received sensor signals. In particular aspects of the disclosed method, determining one or more expected characteristics of the sensor signals is based on the damping control signal. In some aspects of the disclosed method, the method further comprises modifying the damping control signal based on the comparison the one or more characteristics with the one or more expected characteristics.

In one or more aspects of the disclosed method, the information from the one or more sensors comprises one or more of the following: an amplifier voltage in the acoustic transmitter of the wellbore logging tool, an amplifier current in the acoustic transmitter of the wellbore logging tool, an electromagnetic feedback voltage in the acoustic transmitter of the wellbore logging tool, or an acceleration of the acoustic transmitter of the wellbore logging tool.

In one or more aspects of the disclosed method, the one or more characteristics comprises a frequency response of a first sensor signal, the one or more expected characteristics comprises an expected frequency response of the first sensor signal, and the method further comprises comparing the frequency response of the first sensor signals with the expected frequency response of the first sensor signal.

In one or more aspects of the disclosed method, determining one or more characteristics of the sensor signals comprises determining eigenvalues of the sensor signals received from the one or more sensors and determining time derivatives of the eigenvalues of the sensor signals received from the one or more sensors, determining one or more expected characteristics of the sensor signals comprises determining expected time derivatives of the eigenvalues of the sensor signals, and comparing the one or more characteristics of the sensor signals with the one or more expected characteristics comprises comparing the time derivatives of the eigenvalues of the sensor signals with the expected time derivatives of the eigenvalues of the sensor signals.

In one or more aspects of the disclosed method, determining one or more characteristics of the sensor signals comprises determining eigenvalues of the damping control signal and determining time derivatives of the eigenvalues of damping control signal, determining one or more expected characteristics of the sensor signals comprises determining expected time derivatives of the eigenvalues of the damping control signal, and comparing the one or more characteristics of the sensor signals with the one or more expected characteristics comprises comparing the time derivatives of the eigenvalues of the damping control signal with the expected time derivatives of the eigenvalues of the damping control signal.

Illustrative embodiments of the present disclosure have been described herein. In the interest of clarity, not all features of an actual implementation may have been described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

It will be understood that the terms "couple" or "couples" as used herein are intended to mean either an indirect or a direct connection. Thus, if a first device couples to a second device, that connection may be through a direct connection, or through an indirect electrical or mechanical connection via other devices and connections. It will also be understood that the terms "drilling equipment" and "drilling system" are not intended to limit the use of the equipment and processes described with those terms to drilling an oil well. The terms will also be understood to encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, a control unit may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a control unit may be a personal computer, a network storage device, or any other suitable device and may vary in size, shape, performance, functionality, and price. The control unit may include random access memory ("RAM"), one or more processing resources such as a central processing unit ("CPU") or hardware or software control logic, ROM, and/or other types of nonvolatile memory. Additional components of the control unit may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

To facilitate a better understanding of the present disclosure, examples of certain embodiments have been given. In no way should the examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described above with respect to one implementation are not intended to be limiting.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A wellbore logging tool system, comprising:
a processor;
a memory;
a wellbore logging tool comprising an acoustic transmitter; and
a logging tool control module operable to:
receive sensor signals from one or more sensors coupled to the wellbore logging tool after a damping control signal has been transmitted to the acoustic transmitter;
determine one or more expected sensor signals using the damping control signal;
determine error values using the expected sensor signals and the sensor signals received from the one or more sensors; and
compare the error values with one or more thresholds.

2. The system of claim 1, wherein the logging tool control module is further operable to:
receive the sensor signals from the one or more sensors periodically after a damping control signal has been transmitted to the acoustic transmitter; and
determine, for each periodic sensor signal received, an expected sensor signal.

3. The system of claim 1, wherein the logging tool control module is further operable to modify the damping control signal based on the comparison of the error values with the one or more thresholds.

4. The system of claim 1, wherein the information from the one or more sensors comprises one or more of the following: a voltage in the acoustic transmitter of the wellbore logging tool, a current in the acoustic transmitter of the wellbore logging tool, or an acceleration of the acoustic transmitter of the wellbore logging tool.

5. The system of claim 1, wherein the one or more sensors comprise a plurality of sensors and the logging tool control module is further operable to:
determine a sensor error value based on the difference between the expected sensor signal and the sensor signal received from at least one of the one or more sensors; and
compare the sensor error value to one or more sensor error values for each of any one or more other of the plurality of sensors.

6. The system of claim 1, wherein a first sensor signal received from a sensor of the one or more sensors comprises a first signal associated with a first time period and a second signal associated with a second time period, the first signal associated with a first property of the acoustic transmitter and the second signal associated with a second property of the acoustic transmitter.

7. A wellbore logging tool system, comprising:
a processor;
a memory;
a wellbore logging tool comprising an acoustic transmitter; and
a logging tool control module operable to:
receive sensor signals from each of one or more sensors coupled to the wellbore logging tool after a damping control signal has been transmitted to the acoustic transmitter;
determine one or more characteristics of the sensor signals using the damping control signal;
determine one or more expected characteristics of the sensor signals; and
compare the one or more characteristics of the sensor signals with the one or more expected characteristics.

8. The system of claim 7, wherein:
the logging tool control module is further operable to receive the sensor signals from the one or more sensors periodically after a damping control signal has been transmitted to the acoustic transmitter; and
the one or more characteristics of the sensor signals are determined using the periodically received sensor signals.

9. The system of claim 7, wherein the logging tool control module is further operable to modify the damping control signal based on the comparison the one or more characteristics with the one or more expected characteristics.

10. The system of claim 7, wherein the information from the one or more sensors comprises one or more of the following: an amplifier voltage in the acoustic transmitter of the wellbore logging tool, an amplifier current in the acoustic transmitter of the wellbore logging tool, an electromagnetic feedback voltage in the acoustic transmitter of the wellbore logging tool, or an acceleration of the acoustic transmitter of the wellbore logging tool.

11. The system of claim 7 wherein:
the one or more characteristics comprises a frequency response of a first sensor signal;
the one or more expected characteristics comprises an expected frequency response of the first sensor signal; and
the logging tool control module is further operable to compare the frequency response of the first sensor signals with the expected frequency response of the first sensor signal.

12. The system of claim 7, wherein the logging tool control module is further operable to:
determine eigenvalues of the sensor signals received from the one or more sensors;
determine time derivatives of the eigenvalues of the sensor signals received from the one or more sensors; and
compare the time derivatives of the eigenvalues of the sensor signals with the one or more thresholds.

13. The system of claim 7, wherein the logging tool control module is further operable to:
determine eigenvalues of the damping control signal;
determine time derivatives of the eigenvalues of the damping control signal; and
compare the time derivatives of the eigenvalues of the damping control signal with the one or more thresholds.

14. A method for detecting faults in the control of a wellbore logging system, comprising:
receiving sensor signals from one or more sensors coupled to a wellbore logging tool after a damping control signal has been transmitted to an acoustic transmitter of the wellbore logging tool;
determining one or more expected sensor signals using the damping control signal;
determining error values using the expected sensor signals and the sensor signals received from the one or more sensors; and
comparing the error values with one or more thresholds.

15. The method of claim 14, further comprising:
receiving the sensor signals from the one or more sensors periodically after a damping control signal has been transmitted to the acoustic transmitter; and
determining, for each periodic sensor signal received, an expected sensor signal.

16. The method of claim 14, further comprising modifying the damping control signal based on the comparison of the error values with the one or more thresholds.

17. The method of claim 14, wherein the information from the one or more sensors comprises one or more of the following: a voltage in the acoustic transmitter of the wellbore logging tool, a current in the acoustic transmitter of the wellbore logging tool, or an acceleration of the acoustic transmitter of the wellbore logging tool.

18. The method of claim 14, wherein the one or more sensors comprise a plurality of sensors and the method further comprises:
determining a sensor error value based on the difference between the expected sensor signal and the sensor signal received from at least one of the plurality of sensors; and
comparing the sensor error value to sensor error values for each of the other plurality of sensors.

19. The method of claim 14, wherein a first sensor signal received from a sensor of the one or more sensors comprises a first signal associated with a first time period and a second signal associated with a second time period, the first signal associated with a first property of the acoustic transmitter and the second signal associated with a second property of the acoustic transmitter.

20. A method for detecting faults in the control of a wellbore logging system, comprising:
receiving sensor signals from each of one or more sensors coupled to the wellbore logging tool after a damping control signal has been transmitted to the acoustic transmitter of the wellbore logging tool;
determining one or more characteristics of the sensor signals;
determining one or more expected characteristics of the sensor signals using the damping control signal; and
comparing the one or more characteristics of the sensor signals with the one or more expected characteristics.

21. The method of claim 20, wherein:
the method further comprises receiving the sensor signals from the one or more sensors periodically after a damping control signal has been transmitted to the acoustic transmitter; and
the one or more characteristics of the sensor signals are determined using the periodically received sensor signals.

22. The method of claim 20, further comprising modifying the damping control signal based on the comparison the one or more characteristics with the one or more expected characteristics.

23. The method of claim 20, wherein the information from the one or more sensors comprises one or more of the following: an amplifier voltage in the acoustic transmitter of the wellbore logging tool, an amplifier current in the acoustic transmitter of the wellbore logging tool, an electromagnetic feedback voltage in the acoustic transmitter of the wellbore logging tool, or an acceleration of the acoustic transmitter of the wellbore logging tool.

24. The method of claim 20, wherein:
the one or more characteristics comprises a frequency response of a first sensor signal;
the one or more expected characteristics comprises an expected frequency response of the first sensor signal; and
the method further comprises comparing the frequency response of the first sensor signals with the expected frequency response of the first sensor signal.

25. The method of claim 20, wherein:
determining one or more characteristics of the sensor signals comprises:
determining eigenvalues of the sensor signals received from the one or more sensors; and
determining time derivatives of the eigenvalues of the sensor signals received from the one or more sensors;
determining one or more expected characteristics of the sensor signals comprises determining expected time derivatives of the eigenvalues of the sensor signals; and
comparing the one or more characteristics of the sensor signals with the one or more expected characteristics comprises comparing the time derivatives of the eigenvalues of the sensor signals with the expected time derivatives of the eigenvalues of the sensor signals.

26. The method of claim 20, wherein:
determining one or more characteristics of the sensor signals comprises:
determining eigenvalues of the damping control signal; and
determining time derivatives of the eigenvalues of damping control signal;
determining one or more expected characteristics of the sensor signals comprises determining expected time derivatives of the eigenvalues of the damping control signal; and
comparing the one or more characteristics of the sensor signals with the one or more expected characteristics comprises comparing the time derivatives of the eigenvalues of the damping control signal with the expected time derivatives of the eigenvalues of the damping control signal.

* * * * *